US009212759B2

(12) United States Patent
Köpfer et al.

(10) Patent No.: US 9,212,759 B2
(45) Date of Patent: Dec. 15, 2015

(54) VENTIL

(71) Applicant: Alfmeier Präzision AG Baugruppen und Systemlösungen, Treuchtlingen (DE)

(72) Inventors: Markus Köpfer, Regelsweiler (DE); Markus Gebhardt, Weißenburg (DE)

(73) Assignee: Alfmeier Präzision AG Baugruppen und Systemlösungen, Treuchtlingen (DE)

(*) Notice: Subject to any disclaimer, the term of this patent is extended or adjusted under 35 U.S.C. 154(b) by 196 days.

(21) Appl. No.: 13/940,650

(22) Filed: Jul. 12, 2013

(65) Prior Publication Data
US 2014/0125042 A1 May 8, 2014

(30) Foreign Application Priority Data
Jul. 19, 2012 (DE) .......................... 10 2012 212 686

(51) Int. Cl.
*F16K 11/044* (2006.01)
*F16K 31/02* (2006.01)
*F16K 31/00* (2006.01)
(Continued)

(52) U.S. Cl.
CPC ............ *F16K 31/002* (2013.01); *B60R 21/207* (2013.01); *B60R 21/26* (2013.01); *B60R 21/261* (2013.01); *F16K 11/044* (2013.01); *F16K 27/0263* (2013.01); *F16K 31/025* (2013.01); *B60R 21/16* (2013.01); *Y10T 137/86622* (2015.04); *Y10T 137/86678* (2015.04);
(Continued)

(58) Field of Classification Search
CPC .... B60R 21/26; B60R 21/207; B60R 21/261; B60R 21/16; F16K 31/002; F16K 31/025; F16K 11/044; F16K 27/0263; Y10T 137/86678; Y10T 137/86686; Y10T 137/86622; Y10T 137/86694
USPC ............ 137/625.65, 625.67, 625.27, 625.26; 251/11; 280/730.2, 740–742
See application file for complete search history.

(56) References Cited

U.S. PATENT DOCUMENTS 4,491,364 A * 1/1985 Hattori et al. .............. 297/284.6
4,570,676 A * 2/1986 Nishio et al. ................. 137/870
(Continued)

FOREIGN PATENT DOCUMENTS

DE 20218622 2/2003
DE 10257549 8/2004
DE 102008021444 11/2009

OTHER PUBLICATIONS

Office Action dated Apr. 15, 2013, for German Patent Application No. 102012212686.4. Partial machine translation provided.

*Primary Examiner* — John K Fristoe, Jr.
*Assistant Examiner* — Josephine Trinidad-Borges
(74) *Attorney, Agent, or Firm* — Thomas, Karceski & Karmilovich, P.C.

(57) ABSTRACT

A valve has a housing that has a first media opening and encloses a pressure space, and a valve element actuated by at least one wire-shaped SMA element arranged in a pressure space that in a first position closes the media opening and in a second position closes the first media opening that opens the valve element. The valve housing is formed by a housing shell open on one side and a circuit board closing it with which the SMA element is electrically connected.

17 Claims, 4 Drawing Sheets

(51) Int. Cl.
  *B60R 21/207* (2006.01)
  *B60R 21/26* (2011.01)
  *B60R 21/261* (2011.01)
  *F16K 27/02* (2006.01)
  *B60R 21/16* (2006.01)

(52) U.S. Cl.
  CPC .. *Y10T137/86686* (2015.04); *Y10T 137/86694* (2015.04)

(56) References Cited

U.S. PATENT DOCUMENTS

| | | | |
|---|---|---|---|
| 5,584,704 A * | 12/1996 | Romann et al. | 439/130 |
| 6,247,678 B1 * | 6/2001 | Hines et al. | 251/11 |
| 7,267,404 B2 * | 9/2007 | Kern et al. | 297/284.6 |
| 2006/0022334 A1 * | 2/2006 | Myers et al. | 257/724 |
| 2007/0023089 A1 * | 2/2007 | Beyerlein et al. | 137/596.17 |

* cited by examiner

VENTIL

TECHNICAL FIELD

The invention refers to a valve with a housing that has a first media opening that encloses a pressure space, whereby a valve element has been arranged inside the pressure space that controls (i.e. opens and closes) this media opening. The valve element is activated through a wire-shaped SMA element.

BACKGROUND

In a valve known from DE 10 2005 060 217 B4, a circuit board is arranged inside the housing with which the ends of the wire-shaped SMA element (which activates a valve element designed as tappet) are electrically and mechanically connected. In one of its ends, the tappet has been guided into an opening of the circuit board in the direction of its longitudinal extension. Owing to the space needed by the circuit board, the valve housing is correspondingly voluminous, which is a disadvantage when the valve is assembled in a tight space. For more complex control tasks, numerous valves are generally required, in which case the valves—put together as valve arrangements or valve groups—are mounted onto a control board, thus increasing the assembly space for a valve group on the one hand but the mechanical and electrical connection of the valves to the control board involves, on the other hand, a relatively significant mounting effort.

SUMMARY

The task of the invention is to describe a valve of the type mentioned above that corrects this disadvantage.

This task is solved by a valve according to the subject matter of this disclosure. Its housing consists of a housing shell open on one side and a circuit board that closes it with which the SMA element is electrically connected. Because the circuit board is also part of the valve housing, the valve can be less voluminous. Additionally, an electrical connecting element (plug-shaped, for example) for supplying a current to the SMA element on the housing connected to the SMA element through lines on the housing—as is the case with the known valve—is not necessary. Rather, the voltage supply that the SMA element requires can take place in an easily and compactly through conducting paths of the circuit board connected to it with contact pins, for example, which can be connected to a voltage source. It is especially advantageous if many valves should be mounted on a circuit board.

For practical purposes, the circuit board and housing shell are made of plastic. One side or both sides of the circuit board can be equipped with conducting paths. If electrical lines are necessary inside the housing shell to supply the ends of an SMA element rigidly mounted on the housing shell, for example, then the housing shell can be designed as a MID (molded interconnect device). In this case, it consists of injection molded components on which metallic conducting paths have been mounted. These conducting paths can be arranged in such a way that they can make electrical contact with the conducting paths on top when the housing shell is connected to the circuit board.

Preferably, however, the SMA elements are not only electrically connected to the circuit board but mechanically too—i.e. fixed to it through crimp elements—in which case the first media opening is present in the housing shell. When an electric current flows through the SMA element, it shortens and moves the valve element towards the circuit board and away from the first media opening. The advantage here is that no conducting paths are necessary on the housing shell for supplying the SMA element with current, thus resulting in easier manufacturing and assembly. Furthermore, the embodiment mentioned here is manufactured more easily.

First of all, all movable parts of the valve—namely the valve element, the SMA element and a spring element—can be mounted, and the SMA element fixed with its ends onto the circuit board can be pre-stressed into its first position in which it closes the first media opening. The parts mentioned above are thus held to the circuit board independently from the housing shell. Because the circuit board parts mentioned have to be mounted, the housing shell is still missing, and they are easily accessible so automatic mounting can take place. This automatic mounting also facilitates the following mounting step, in which a housing shell is placed over the assembly consisting of valve element, spring element and SMA element and fixed to the circuit board. Thus, large-scale manufacturing of valves or valve arrangements can be achieved with little assembly effort.

In another preferred embodiment variant, a second media opening not controlled by a separate valve element is present, as is the case with the valve known from DE 10 2005 060 217 B4, for example, but by the valve that already controls the first media opening. In the first position, the valve element closes the first media opening and releases the second media opening. In the second position, on the other hand, it releases the first media opening and closes the second media opening. This embodiment allows one to further reduce valve volume. In addition, the valve manufacturing and assembly effort is reduced especially when the second media opening is present in the circuit board.

BRIEF DESCRIPTION OF THE DRAWINGS

A more advantageous design of the invention is explained in detail below with the help of drawings, which show schematically.

DETAILED DESCRIPTION

Figure 1:
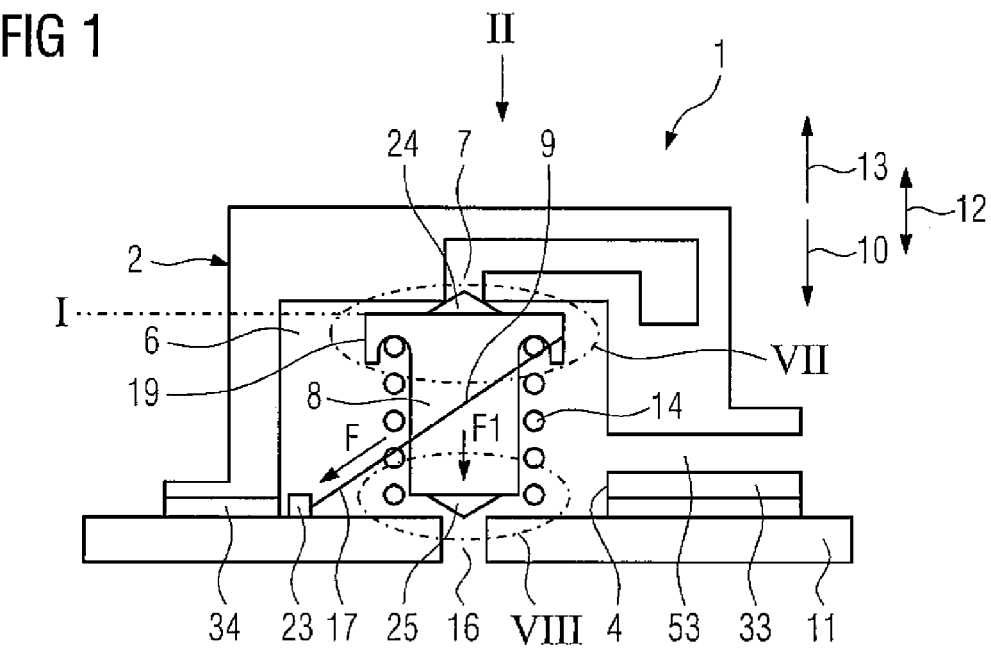
FIG. 1: A first embodiment of a valve shown in cross section.

The valves 1 shown in FIGS. 1 to 4 comprise a housing 2, which is formed by a housing shell 3 and a circuit board 11. One side of the housing shell 3 is open, i.e. there is an opening 4 on one side of the housing shell 3, closed by the circuit board 11. If there is a valve arrangement 5 (FIG. 5) made up of several valves 1, the openings 4 of the individual valves are closed by a common circuit board 4a, in other words by a partial area thereof. The interior of the housing 2 formed in this way delimits a pressure space 6. In the housing shell 3 there is a first media 7 opening present that ends in the pressure space 6. A fluid or gas can be used as the medium, but reference to a pneumatic valve is made below and the medium is air. In the pressure space 6, there is a valve element 8, which is freely movable between a first position I that closes the first media opening 7 (FIGS. 1 and 3) and a second position II that releases the first media opening 7. The valve element 8 is activated by a wire-shaped SMA element 9 in opening direction 10—in terms of the first media opening 7—or in the direction of its position II. In the contrary direction (i.e., in closing direction 13), once again in terms of the first media opening 7, the valve element 8 is impinged by a spring element. In the embodiment shown in FIG. 1, the spring element is a helical pressure spring 14, and in the embodiment shown in FIG. 3, it is a leaf spring 15.

The housing 2 has a second media opening 16, whereby it is interspersed with the circuit board 11 if present. The first media opening 7 and the second media opening 16 are largely situated opposite the moving direction 12 of the valve element 8, in which case the moving direction 12 can be a linear or translational motion or a swiveling motion.

Figure 2:
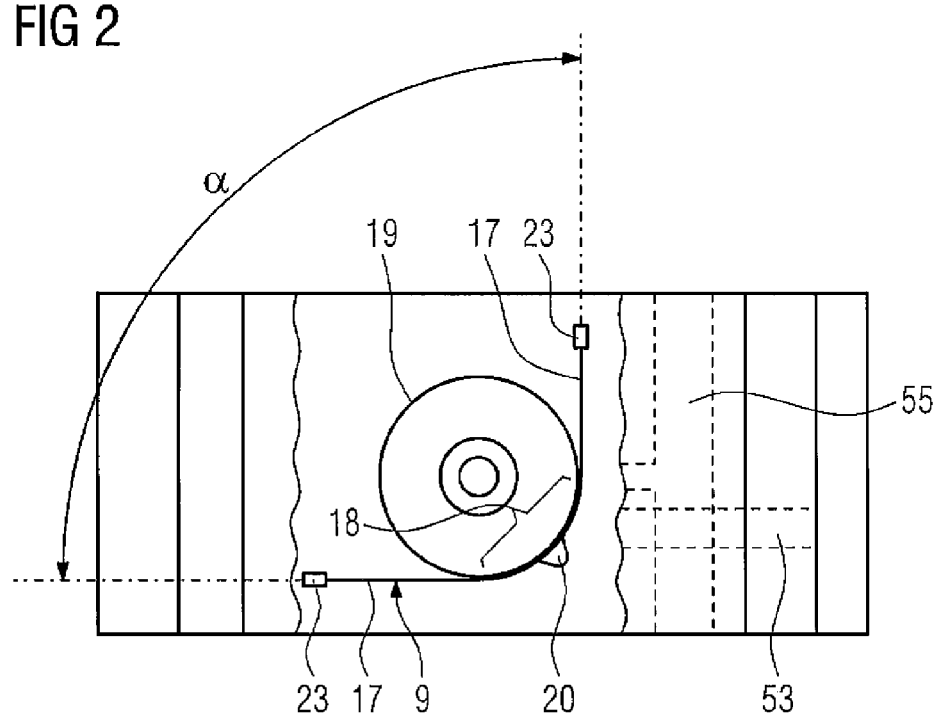
FIG. 2: A top view of the valve shown in FIG. 1 in the direction of the arrow II, whereby the housing shell has been partially broken open.
Figure 4:
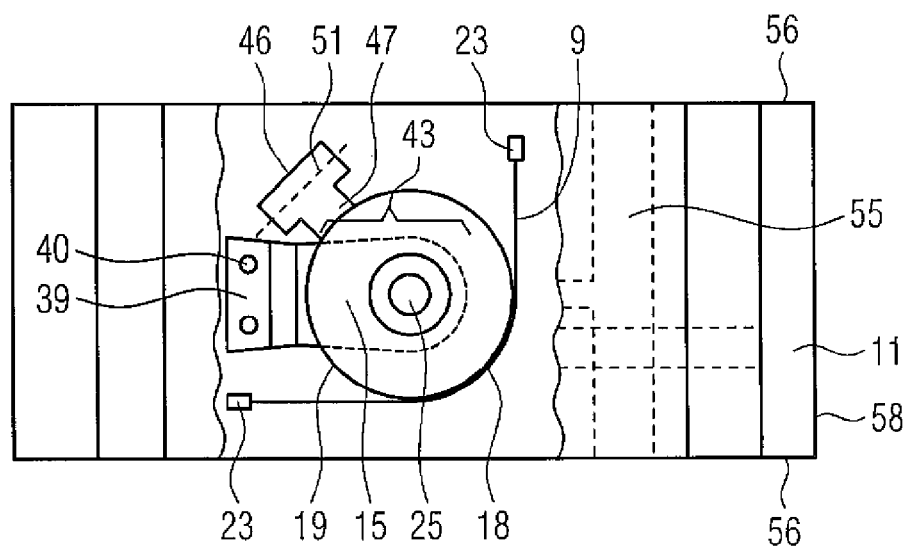
FIG. 4: A top view of the valve shown in FIG. 3 in the direction of the arrow IV.
Figure 7:
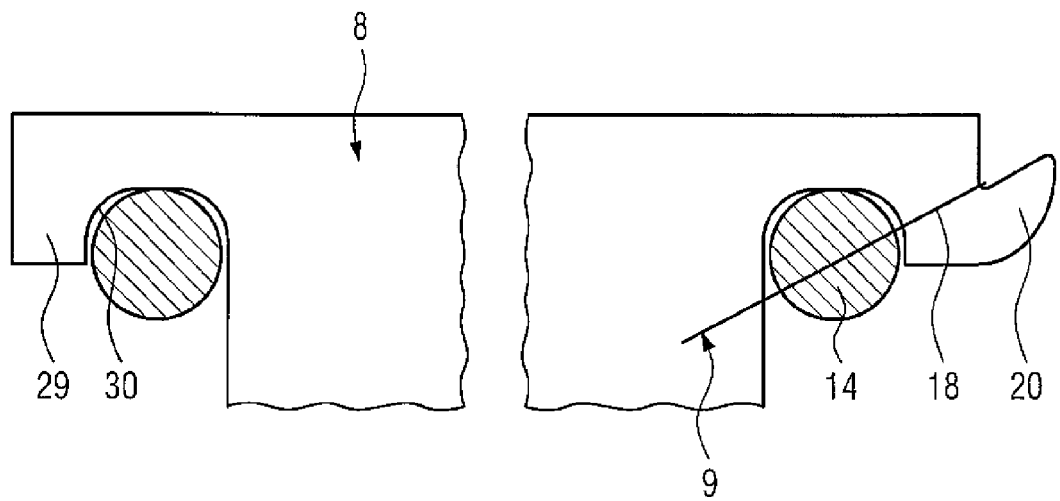
FIG. 7: A detail of the valve element of a valve according to cutout VII in FIG. 1, FIG. 8: Another detail of the valve element according to cutout VIII in FIG. 1.
Figure 8:
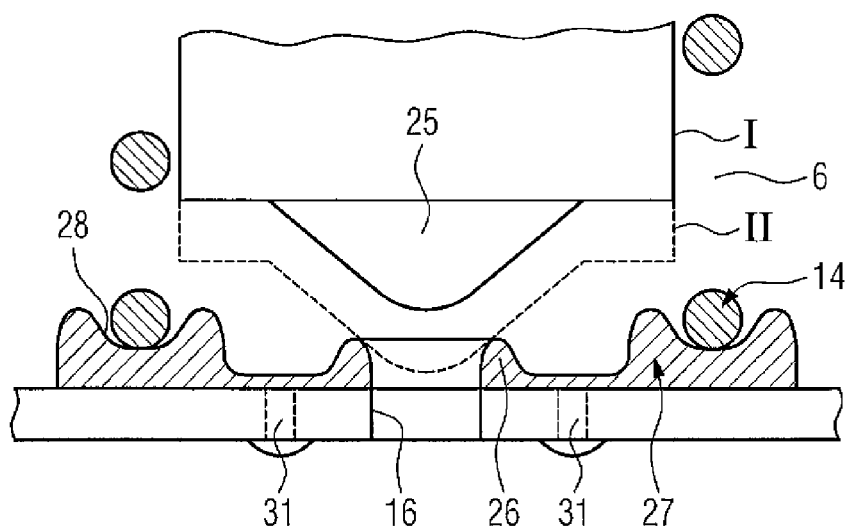

In the top view shown in FIG. 2 or 4, the wire ends 17 of the SMA element run across to one another, in which case they enclose an angle α of about 90°. In the side view shown in FIG. 1, the wire ends 17 run obliquely upwards or towards the first media opening 7, whereby they enclose an acute angle β with the moving direction 12 or with an imaginary line 21 that extends centrically through the media openings 7, 16. In other words, the SMA element extends along a plane 22, which encloses the angle β with the moving direction 12 or the imaginary line 22. In doing so, a middle section 18 of the SMA element encompasses a peripheral surface area 19 of the valve element 8 that is circular. However, the valve element 8 can also have other cross-sectional shapes. The fastening of the middle section 18 of the SMA element 9 on the peripheral surface area 19 is accomplished, for example, with a hook 20 protruding from it (FIG. 7), on which the SMA element 9 supports itself. The fastening of the wire ends 17 to the circuit board 11 takes place, for example, through crimp elements 23a fixed to it and electrically connected to the conducting paths present in it (not shown).

Figure 3:
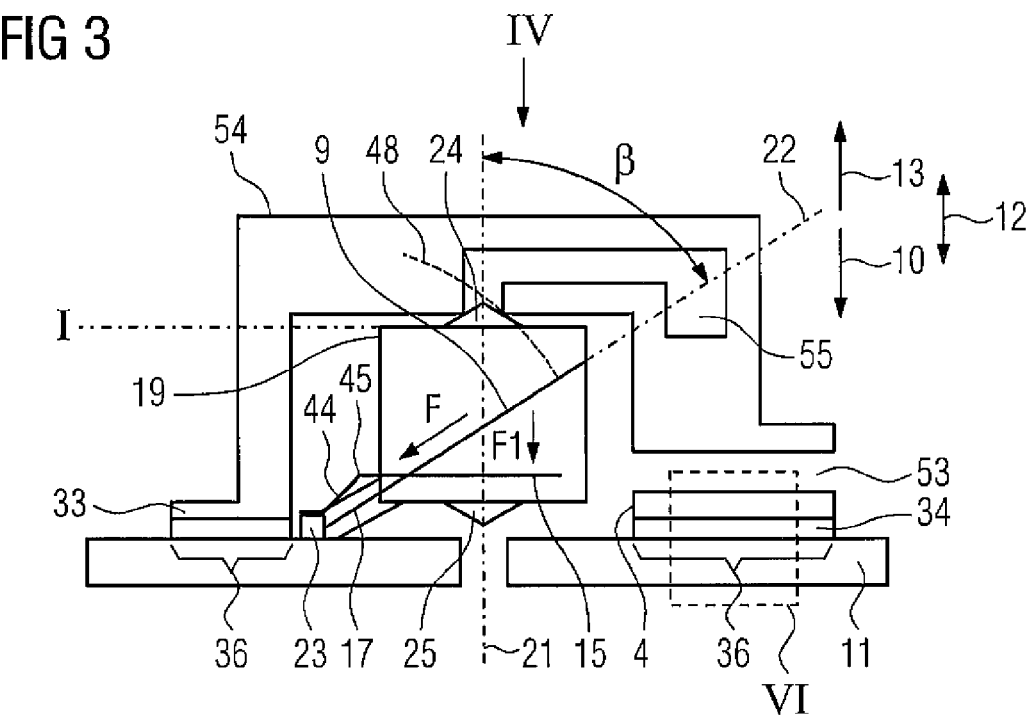
FIG. 3: A second embodiment of a valve shown in cross section.

To actuate the valve element 8, current runs through the SMA element 9, i.e. one wire end 17 is connected to a plus pole and the other wire end 17 is connected to the minus pole of a voltage source. The result is a shortening of the SMA element 9 and the valve element 8 is moved to its second position II (see FIG. 9), in which the first media opening 7 is opened and the second media opening 16 is closed. The force F exerted on the valve element (which results from the shortening of the SMA element) extends along the plane 22 stretched by the SMA element and thereby obliquely towards the moving direction 12 or towards the imaginary line 21. In the process, owing to the guidance of the valve element in moving direction, a force component F1 arises in the direction of position II of the valve element, in which case it runs parallel to the moving direction 12 or to the line 22. The guidance of the valve element in moving direction 12 is ensured solely by the spring element—i.e., by the helical pressure spring 14 (FIGS. 1 & 2) or the leaf spring 15 (FIGS. 3 & 4).

To ensure a tight closure of the media openings 7 and 16, a sealing element 24, 25 is present on each side of the valve element 8 facing the sides of the openings mentioned above and the element acts together with a sealing seat 26 that borders the openings 7, 16. This situation is shown in case the media opening 16 is opened, whereby a corresponding design is also provided for sealing the media opening 7. In doing so, the sealing seat 26 can be formed by the edge of the opening itself or by an element arranged in the area of the respective opening. For example, in the case of the second media opening 16 present in the circuit board 11, it is convenient for a sealing seat 26 holding a form element 27 to be attached to the side facing the pressure space 6, for example glued to it or fastened with mechanical fastening elements 31.

In the valve shown in FIG. 1, the spring element is a helical pressure spring 14 that is directly or indirectly braced against the valve element 8 with one of its ends and directly or indirectly against the circuit board 11 with its other end. In order to ensure a lateral mounting of the helical pressure spring 14 and of the valve element 8 with it (i.e. to ensure transversal fastening towards the moving direction 12), a circular recess 28 shaped like a groove is present on the circuit board 11 that at least takes up partially the first turn of the helical pressure spring 14. The recess 28 is conveniently present on the molded part 27, which also holds the sealing seat 26. To support the other end of the helical pressure spring 14 on the valve element 8, it has a radially protruding flange 29 in the end facing the first media opening 7 on which the helical pressure spring 14 supports itself. In doing so, an annular groove 30 that holds the supporting end of the helical pressure spring 14 is present on the underside of the flange.

A fluid-tight fastening of the housing shell 3 to a circuit board 11 can take place, for example, by placing a foil-shaped sealing element 34 (made from an elastomeric material, for example) between the front side 33 of the housing shell 3 to be connected to the circuit board and the circuit board 11. The mutual pressing together of housing shell 3 and circuit board 11 by clamping the sealing element 34 can be accomplished by a fixation element 35 shaped like a rivet, screw or the like. The area of the circuit board 11 on which the housing shell 3 is fastened to can be a metalized mounting area 36, especially provided with a copper layer. Regardless of another material of the circuit board 11 that might have a non-even or rough surface, it ensures a smooth and even surface and therefore a sealing installation of the seal 34 on the circuit board 11 able to withstand the pressure in the pressure space 6. The mounting area 36 has a shape supplementing the front side 33 of the housing shell 33 and it can be rectangular or square. An inner area 37 of the circuit board 11 circumscribed by the mounting area 36 forms a wall that closes the opening 4 of the housing shell and stays in contact with the pressure space 6 until possibly provided electrical contact positions, e.g. for the wire ends 17 of the SMA element 9.

Figure 5:
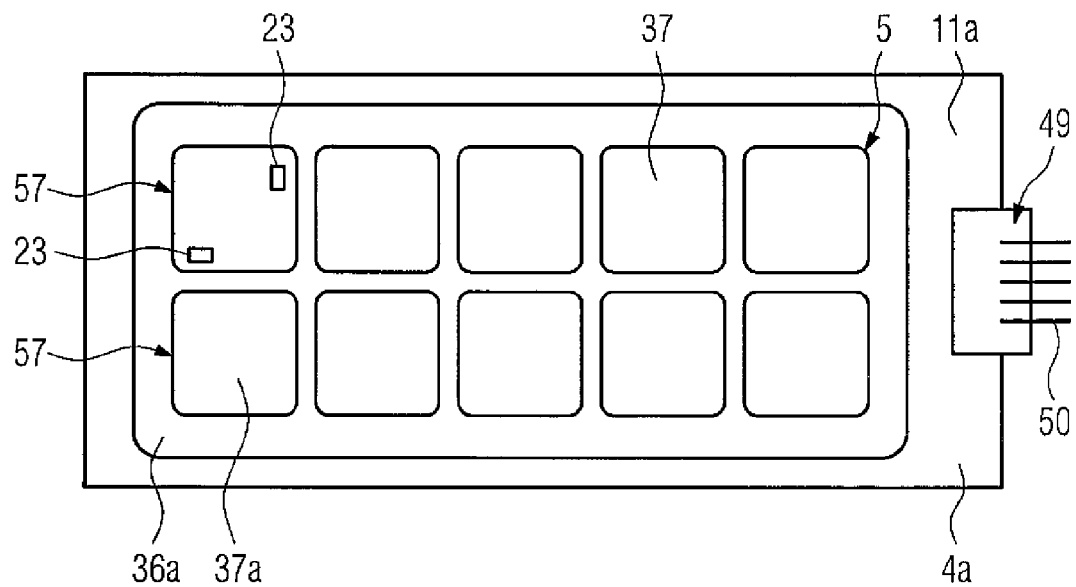
FIG. 5: A top view of a circuit board for receiving many housing shells of the intended circuit board.
Figure 6:
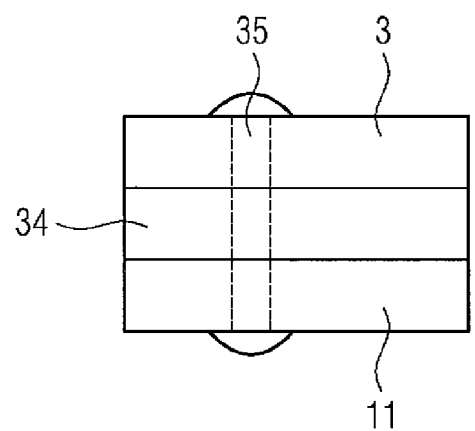
FIG. 6: The cutout VI of FIG. 3, which shows a possibility of fixing the housing shell onto a circuit board.

If a valve arrangement 5 comprises several valves 1, FIG. 5 shows only one mutual circuit board 11a that accepts several valves 1 or housing shells 3. The mounting area 36a has a grid-like design, in which case the mounting area 36a has inner areas 37a with a grid corresponding to one of the arrangement grids of the housing shells 3 to be fastened onto the circuit board 11a. In an inner area, contact points (particularly crimp elements 23) have been arranged for the wire ends of the SMA elements 9, which have been drawn in FIG. 5 only in one inner area for simplification purposes. The contact points are connected to the conducting paths (not shown) via through-hole-platings on the back side of the circuit board 11a. So current can flow through the SMA elements 9, at least one electrical connection 49 is present in the circuit board 11a, for example in the form of plug-in connections 50. The same also applies to the circuit board 11 of an individual valve 1.

A leaf spring 15 has been provided as spring element in the embodiment shown in FIGS. 3 and 4. Its overall design resembles more or less a tongue and one of its ends is directly or indirectly connected to the circuit board 11 by means of rivets 40 or similar mechanical fixation elements 40, for example. A longitudinal section separated from the end 39 impinges on the valve element 8 in the area of its lower end that faces the circuit board 11, whereby it abuts on its underside or extends into the interior of the valve element 8, roughly being extrusion coated by the plastic material of the valve element 8. An oblique section 44 extends between the longitudinal section 43 and the end 39 of the leaf spring 15 fixed to the circuit board 11. A bend 45 acting as a foil hinge is present between it and the longitudinal section 42. The valve element 8 itself has been arranged outside of the valve element so it can swivel in an axis 46 running roughly tangentially to its circular circumference. The axis 46 is linked as one piece to the valve element 8 via a connecting link 47 and spaced from the end 39 of the leaf spring 15 fixed to the circuit board 11—seen from the circumferential direction of the valve element 8. Between the two positions I and II, the sealing elements 24 and 25 therefore traverse circular orbits 48 whose center lies on the axis 46 or on the imaginary swiveling axis (broken line 51) allocated to it.

Apart from the media openings already mentioned, the valve 1 has a third media opening 53 and is therefore a valve with three openings, or connection options, and two switch positions, i.e. a 3/2-way valve. Such valves can be used for controlling air bags in a vehicle seat, for example, in order to offer a massage function. In this case, the first media opening 7 is for connection to a pressurized air source, the second media opening 16 for connecting the pressure space 6 to ambient air and the third opening 53 serves for connecting to a seat pocket or, generally speaking, to a media vault. To ensure a common supply of the first media openings with pressurized air, it is conceivable for the first media openings 7 to end in the upper side 54 of the housing shell 3 that faces away from the circuit board. In this case, these openings can be supplied with pressurized air through a distribution channel (not shown) fastened to several housing shells 3 arranged in series, for example. In the embodiments shown, the first media opening 7 is linked to a channel 55 running inside the wall of the housing shell 3 that ends in two opposite external sides 56 of the rectangular or square housing shell 3, for example. If a valve arrangement according to FIG. 5 has to be created with several valves 1, then the housing shells 3 must be arranged beside one another in a row 57 so their external sides 56 touch against each other. In doing so, pressure-sealing connection of the housing shells 3 can be achieved by gluing or welding (e.g. by laser welding). In the outermost housing shell 3 of a row 57, the channel 55 can be closed with a plug (not shown). It is also conceivable that housing shells 3 are held up and that one side of the channel 55 is already closed in advance. The third media openings are present in one external side 58 of the housing shell 3 that runs obliquely to the external sides 56. A connecting hose (not shown) can be fixed to the third media opening 53 for connection to an air bag, for example.

The invention claimed is:

1. A valve comprising: a housing that has a first media opening and encloses a pressure space, and a valve element actuated by at least one wire-shaped SMA element arranged in the pressure space that in a first position closes the first media opening and in a second position opens the first media opening, wherein the valve housing is formed by a housing shell open on one side and a circuit board closing it to which the SMA element is electrically connected, a second media opening controlled by the valve element being present in the circuit board, wherein the valve element when in the first position closes the first media opening and releases the second media opening, and when in the second position releases the first media opening and closes the second media opening.

2. The valve according to claim 1, wherein the first media opening is present in the housing shell and that the SMA element impinges on the valve element in the opening direction with regard to the first media opening.

3. The valve according to claim 1, wherein the valve element is fixed to the circuit board.

4. The valve according to claim 2, wherein the ends of the at least one SMA element are mechanically linked to the circuit board.

5. The valve according to claim 1, wherein a spring element impinges on the valve element in closing direction with regard to the first media opening.

6. The valve according to claim 1, wherein the valve element is arranged in such a way that it executes a translational motion between the first and second position (I, II).

7. The valve according to claim 1, wherein the valve element is arranged in such a way that it executes a swiveling motion between the first and second position (I, II).

8. The valve according to claim 5, wherein the spring element is a helical pressure spring or a leaf spring that supports itself on the circuit board and pre-stresses the valve element in the first position (I).

9. The valve according to claim 1, wherein there is a third media opening in the housing shell.

10. The valve according to claim 9, wherein the first media opening is a pressure connection, the second media opening is an atmospheric connection and the third media opening is a connection for a media vault.

11. The valve according to claim 1, wherein the housing shell abuts on a metalized area of the circuit board.

12. The valve according to claim 11, wherein a sealing element is arranged between the housing shell and the metalized area.

13. The valve according to claim 1, wherein, the housing shell is form-fittingly connected to the circuit board.

14. The valve according to claim 1, wherein it is a part of an air bag system integrated to a vehicle seat.

15. The valve arrangement comprising more than one valve according to claim 1, whereby the housing shells of the valves are closed by a common circuit board.

16. The valve arrangement according to claim 15, wherein the first media openings of the valves are connected to one another via a distribution channel.

17. The valve arrangement according to claim 16, wherein the housing shells of the valves are linked to one another as one piece.

* * * * *